United States Patent
Childress

(10) Patent No.: US 10,188,079 B2
(45) Date of Patent: Jan. 29, 2019

(54) STRAP FOR ATTACHING A DECORATIVE ORNAMENT TO THE HEAD OF A PET

(71) Applicant: Anne Elizabeth Childress, Goodyear, AZ (US)

(72) Inventor: Anne Elizabeth Childress, Goodyear, AZ (US)

(*) Notice: Subject to any disclaimer, the term of this patent is extended or adjusted under 35 U.S.C. 154(b) by 202 days.

(21) Appl. No.: 15/227,498

(22) Filed: Aug. 3, 2016

(65) Prior Publication Data

US 2017/0347628 A1    Dec. 7, 2017

Related U.S. Application Data

(60) Provisional application No. 62/344,190, filed on Jun. 1, 2016.

(51) Int. Cl.
*A01K 13/00* (2006.01)

(52) U.S. Cl.
CPC .................................. *A01K 13/00* (2013.01)

(58) Field of Classification Search
CPC ........ A01K 13/00; A01K 13/006; A42B 1/24; A42B 3/08; A42B 1/045
See application file for complete search history.

(56) References Cited

U.S. PATENT DOCUMENTS

| | | | | |
|---|---|---|---|---|
| 3,020,555 A * | 2/1962 | Taylor | .................... | A42B 1/201 135/22 |
| 4,969,317 A * | 11/1990 | Ode | .................... | A01K 13/006 54/80.2 |
| 5,031,388 A * | 7/1991 | Ode | .................... | A01K 13/006 54/80.2 |
| 5,732,415 A * | 3/1998 | Boyd | .................... | A61D 9/00 119/836 |
| 5,893,173 A * | 4/1999 | Bray | .................... | A01K 13/006 119/850 |
| 6,863,032 B2 * | 3/2005 | Di Lullo | .................... | A01K 13/006 119/850 |
| 7,581,513 B2 * | 9/2009 | Di Lullo | .................... | A01K 13/006 119/850 |
| 7,980,203 B1 * | 7/2011 | Rubottom | .................... | A01K 27/006 119/856 |
| 8,402,926 B1 * | 3/2013 | Nunez | .................... | A01K 13/006 119/850 |
| 2017/0064923 A1 * | 3/2017 | Choi | .................... | A01K 13/006 |

* cited by examiner

*Primary Examiner* — Kristen C Hayes

(74) *Attorney, Agent, or Firm* — Morgan Law Offices, PLC

(57) ABSTRACT

The present invention comprises a strap assembly that permits various decorative items to be worn comfortably on the head of a pet without easily falling or being pulled off. The strap assembly can be made of a thin, clear or translucent elastic plastic material making it nearly invisible. Alternatively, the strap can be made of a colored or opaque plastic material, or even a woven fabric.

8 Claims, 2 Drawing Sheets

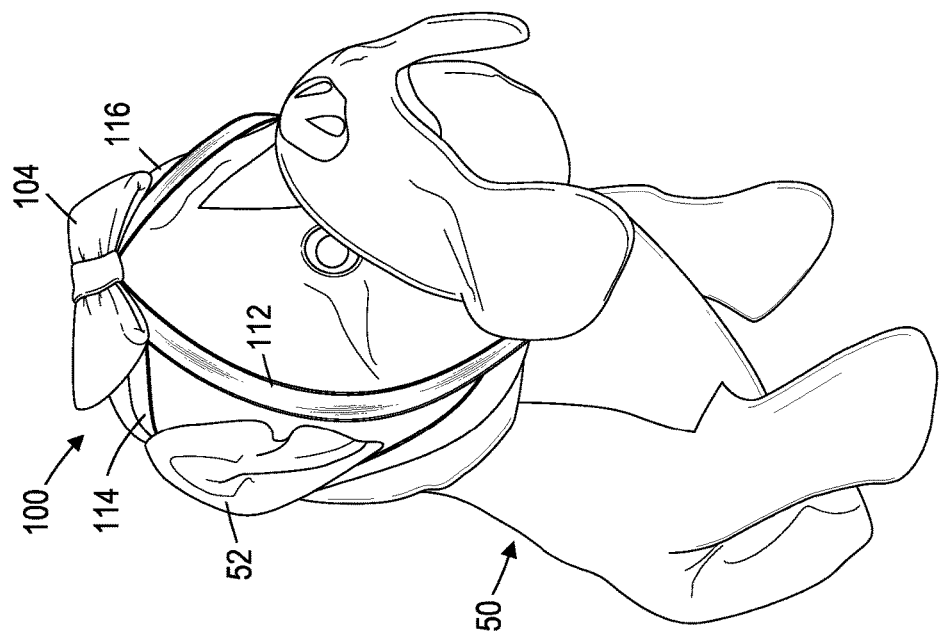
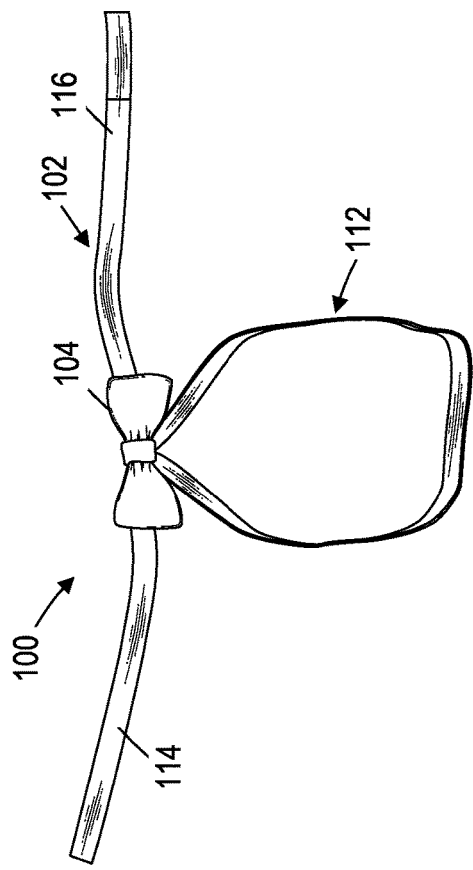
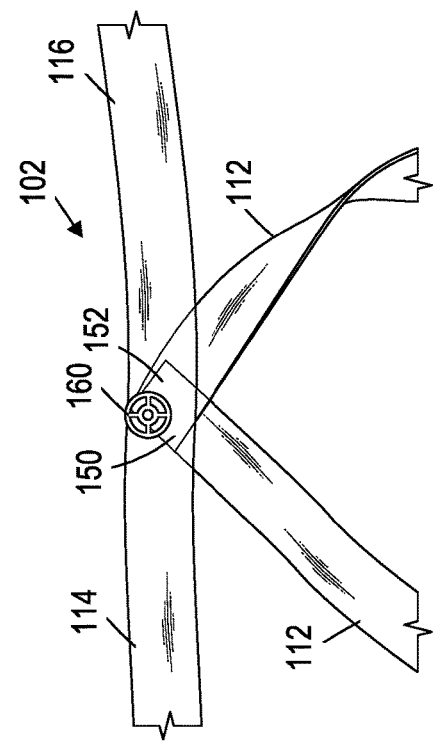

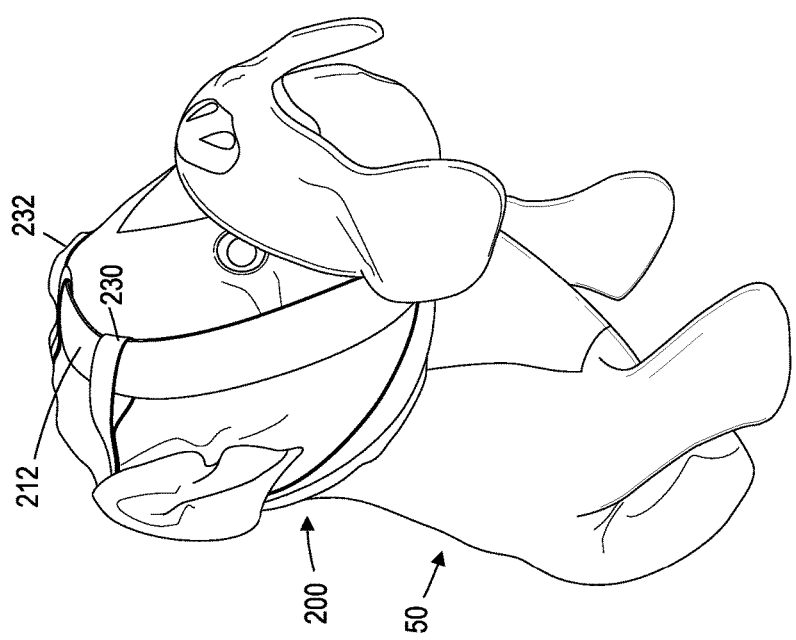
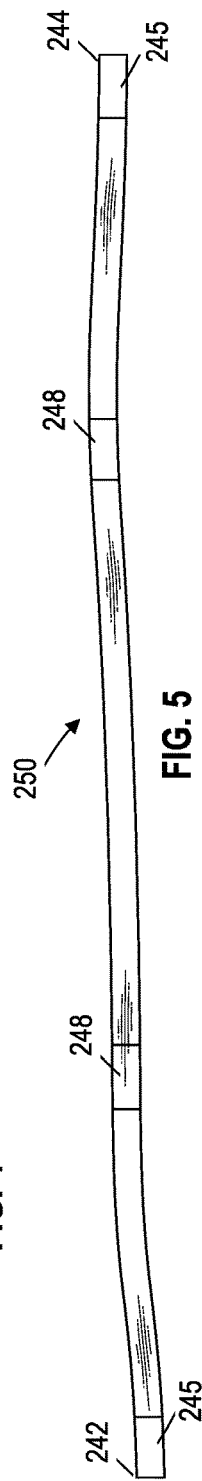
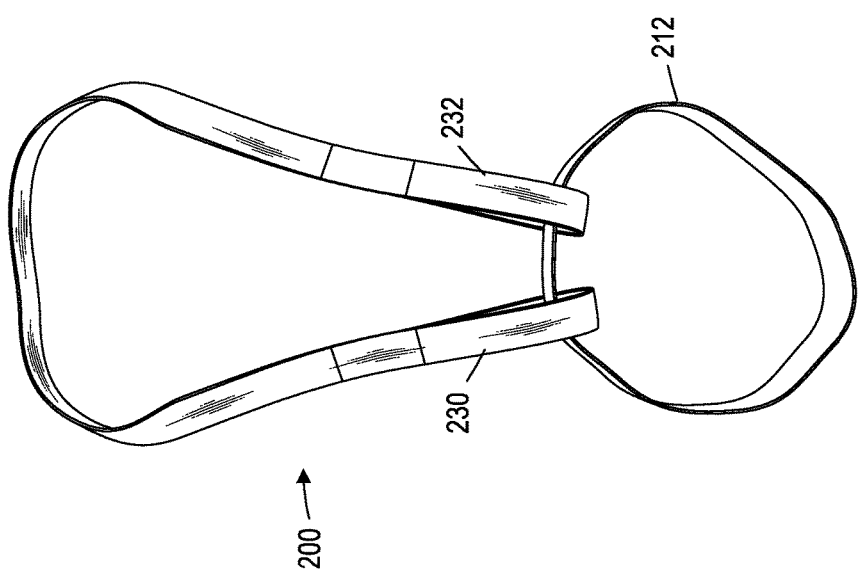

US 10,188,079 B2

STRAP FOR ATTACHING A DECORATIVE ORNAMENT TO THE HEAD OF A PET

CROSS-REFERENCE TO RELATED APPLICATIONS

This application claims the benefit of U.S. Provisional Application No. 62/344,190, filed on Jun. 1, 2016, the subject matter of which is incorporated herein by reference.

BACKGROUND OF THE INVENTION

1. Field of the Invention

The present invention relates to ornamental accessories for animals, and more particularly to a strap for attaching an ornamental accessory to the head of a pet.

2. Description of the Related Art

Many pet owners enjoy creatively dressing up their pets. For example, dog owners will sometimes adorn their pet with a knit sweater and boots or the like. However, when the pet is provided with a decorative ornament to be worn on its head, such as a bow or headband, the animal will invariably find some way to pull it off. Although it is possible to employ temporary measures to secure the ornament, such as using a clip, it will not take long for the item to fall or be pulled off.

SUMMARY OF THE INVENTION

The present invention comprises a strap assembly that permits a decorative item to be worn comfortably on the head of a pet without easily falling or being pulled off. The strap assembly can be made of a thin, clear or translucent elastic plastic material making it nearly invisible. Alternatively, the strap can be made of a colored or opaque plastic material, or even a woven fabric.

In a first embodiment, the strap assembly includes a chin strap in the shape of a loop for placement under the chin of an animal, a first ear strap for placement around a first ear, and a second ear strap for placement around a second ear. Each of the ear straps is attached to the chin strap at a place where a bow, or other similar ornament, may be attached. The ornament may be snapped on or off, and can be easily replaced with another interchangeable ornament. The ear straps can be joined together (e.g., by a pressure-sensitive adhesive) thereby permitting the joined-together strap to be tucked under the neck of the animal In a second embodiment, the strap assembly includes an elongated strip structured to permit looped ends to be formed. The looped ends may be secured using a hook and loop fastener (e.g. Velcro®), or the like. In operation, a decorative band can be placed onto the animal's head such that the band is secured around the top of the head and the chin. The looped ends of the strap are each attached and looped onto the decorative band, with the remainder of the strap wrapped around each of the ears.

BRIEF DESCRIPTION OF THE DRAWINGS

FIG. 1 illustrates a strap in accordance with a first embodiment of the present invention.

FIG. 2 illustrates the strap as in FIG. 1 showing a snap fastener portion.

FIG. 3 illustrates the strap as in FIG. 1 worn by a dog supporting a bow.

FIG. 4 illustrates a strap in accordance with a second embodiment of the present invention.

FIG. 5 illustrates an elongated strip useable for constructing the strap as in FIG. 4.

FIG. 6 illustrates the strap as in FIG. 4 worn on a dog supporting the decorative band.

DETAILED DESCRIPTION OF THE INVENTION

Referring to FIG. 1, a strap assembly 100 is shown, according to a first embodiment. The strap assembly 100 includes a chin strap 112 in the shape of a loop for placement under the chin (FIG. 3, 120) of an animal, a first ear strap 114 for placement around a first ear, and a second ear strap 116 for placement around a second ear (FIG. 3). The first ear strap 114 and the second ear strap 116 can further be joined together (e.g., by a pressure-sensitive adhesive, a hook-and-loop fastener) thereby permitting the jointed-together strap to be tucked under the neck of the animal (FIG. 3). The first ear strap 114 and the second ear strap 116 can be portions of a single, elongated strip 102. As illustrated, a decorative ornament 104 is attached to the strap assembly 100 at a location where the chin strap 122, the first ear strap 114 and the second ear strap 116 meet. Although the illustrated decorative ornament 104 is a bow, it is to be appreciated that various other types of ornaments could be similarly attached. Furthermore, the user can be supplied with numerous and various ornaments that are interchangeable. Notably, an ornament can be detached and another one attached without removal of the strap assembly 100 from the animal. The strap assembly 100 can be constructed of a clear or translucent plastic material so that the strap assembly 100 is difficult to see when worn. Alternatively, the strap assembly 100 can be made of a colored or opaque plastic material, or even a woven fabric. The strap assembly 100 can be made of an elastic material, allowing the strap assembly 100 to be snugly fit onto the animal and to resist removal.

Referring to FIG. 2, an exemplary female half 160 of a snap fastener is illustrated. As shown, the female half 160 is affixed where the decorative ornament 104 is to be attached. Ends 150, 152 of the chin strap 112 can be secured at approximately the middle of the elongated strip 102, dividing the elongated strip 102 into the first ear strap 114 and the second ear strap 116. It is to be understood that the decorative ornament 104 will include a complementary male half of the snap fastener (not shown) permitting the decorative bow 104 to be snapped onto the strap assembly 100. It is to be further understood that other suitable fastening means (e.g., Velcro, magnets, adhesive) may be used to attach the decorative ornament 104 to the strap assembly 100.

Referring to FIG. 3, the strap 100 as in FIG. 1 is shown worn by a dog 50 supporting a decorative ornament 104 in the form of a bow.

Referring to FIG. 4, a strap assembly 200 is shown, according to a second embodiment. The strap assembly 200 serves to support a decorative band 212 positioned on an animal, such as a dog (FIG. 6). As shown, the strap assembly 200 includes looped ends 230, 232. The decorative band 212 passes through the looped ends 230, 232, as shown.

Referring to FIG. 5, an exemplary elongated strip 250 that can be used to form the strap assembly 200 is illustrated. The elongated strip 250 can be made of the same materials discussed above for the strap assembly 100. The looped ends 230, 232 can be formed by folding distal ends 242, 244 over, forming respective loops. The distal ends 242, 242 can each include a "hook" portion 245 of a hook-and-loop fastening material (e.g., Velcro®) attachable to a "loop" portion 248 of the hook-and-loop fastening material positioned a few inches from the respective ends as shown, or vice versa.

Referring to FIG. 6, the strap assembly 200 as in FIG. 4 is shown worn by a dog 50 supporting the decorative band 212. As shown, the decorative band 212 is placed onto the dog's head such that the decorative band 212 is secured around the top of the head and the chin. As shown in FIG. 6, the looped ends 230, 232 are each attached and looped onto the decorative band 212, with the remainder wrapped around the dog's ears 52, thus securing the decorative band on the dog's head so as to be difficult to fall or be pulled off.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A strap assembly for securing a decorative ornament to a head of an animal, comprising:
   a chin strap comprising a continuous loop;
   a first ear strap for placement around a back of a first ear of the animal;
   a second ear strap for placement around a back of a second ear of the animal; and
   an ornament attachment device permitting an ornament to be removably attached thereto;
   wherein the first ear strap and the second ear strap can be joined together permitting the joined-together ear straps to wrap under the neck of the animal;
   wherein the first ear strap and the second ear strap are portions of a single, continuous elongated strip when joined together;
   wherein the chin strap is attached to the continuous elongated strip;
   wherein the ornament attachment device is attached to the chin strap and the continuous elongated strip at the point where the chin strap and the continuous elongated strip are attached together.

2. The strap assembly of claim 1, wherein chin strap, the first ear strap, and the second ear strap are made of a substantially clear material.

3. The strap assembly of claim 1, wherein chin strap, the first ear strap, and the second ear strap are made of a substantially translucent material.

4. The strap assembly of claim 1, wherein chin strap, the first ear strap, and the second ear strap are made of a substantially elastic material.

5. The strap assembly of claim 1, wherein the ornament attachment device includes a female portion of a snap fastener.

6. The strap assembly of claim 1, wherein the ornament is a bow.

7. The strap assembly of claim 1 wherein the ornament attachment device is a female portion of a snap fastener and the ornament is a bow including a male portion of a snap fastener.

8. A method for securing a decorative ornament to the head of an animal, comprising:
   providing the strap assembly of claim 1;
   looping the chin strap of the strap assembly around the chin of the animal;
   looping the first ear strap of the strap assembly around a back of the first ear of the animal;
   looping the second ear strap of the strap assembly around a back of the second ear of the animal;
   joining together remaining ends of the first ear strap and the second ear strap;
   tucking the joined-together ear straps under the neck of the animal; and
   attaching a decorative ornament to the ornament attachment device of the strap assembly.

* * * * *